US005744884A

United States Patent [19]

Gerhard

[11] Patent Number: 5,744,884
[45] Date of Patent: Apr. 28, 1998

[54] LINER MOTION MICROPOSITIONING APPARATUS AND METHOD

[75] Inventor: Gregory J. Gerhard, Seattle, Wash.

[73] Assignee: Applied Precision, Inc., Issaquah, Wash.

[21] Appl. No.: 544,309

[22] Filed: Oct. 17, 1995

[51] Int. Cl.$^6$ ................................................. H02K 7/06
[52] U.S. Cl. ................................................. 310/80; 310/12
[58] Field of Search ................................. 310/80, 12, 49 R, 310/254; 74/89.15, 89.17

[56] References Cited

U.S. PATENT DOCUMENTS

| | | | |
|---|---|---|---|
| 4,764,696 | 8/1988 | Fukaya et al. | 310/49 R |
| 4,947,070 | 8/1990 | Hill et al. | 310/80 |
| 4,980,590 | 12/1990 | Taniguchi et al. | 310/81 |
| 5,051,635 | 9/1991 | Kasahara | 310/80 |
| 5,053,685 | 10/1991 | Bacchi | 318/135 |
| 5,125,067 | 6/1992 | Erdman | 388/934 |
| 5,359,246 | 10/1994 | Kuklo | 310/49 R |

OTHER PUBLICATIONS

Applied Precision, Inc., Nanomover™ 22 mm Travel Range pamphlet.
Melles Griot, Nanomover™ System #27.
Mitutoyo, Measuring Instruments, Catalog No. 300.

*Primary Examiner*—Steven L. Stephan
*Assistant Examiner*—Michael J. Wallace, Jr.
*Attorney, Agent, or Firm*—Richardson & Folise

[57] ABSTRACT

A linear motion micropositioning device employs a housing containing fixed, electrically excited stators. A rotating permanent magnet rotor is directly attached to a spindle of a precision lead screw. The stators are provided with sufficient axial depth to permit the rotor to rotate and reciprocate axially while under continuous magnetic influence of the stators.

10 Claims, 3 Drawing Sheets

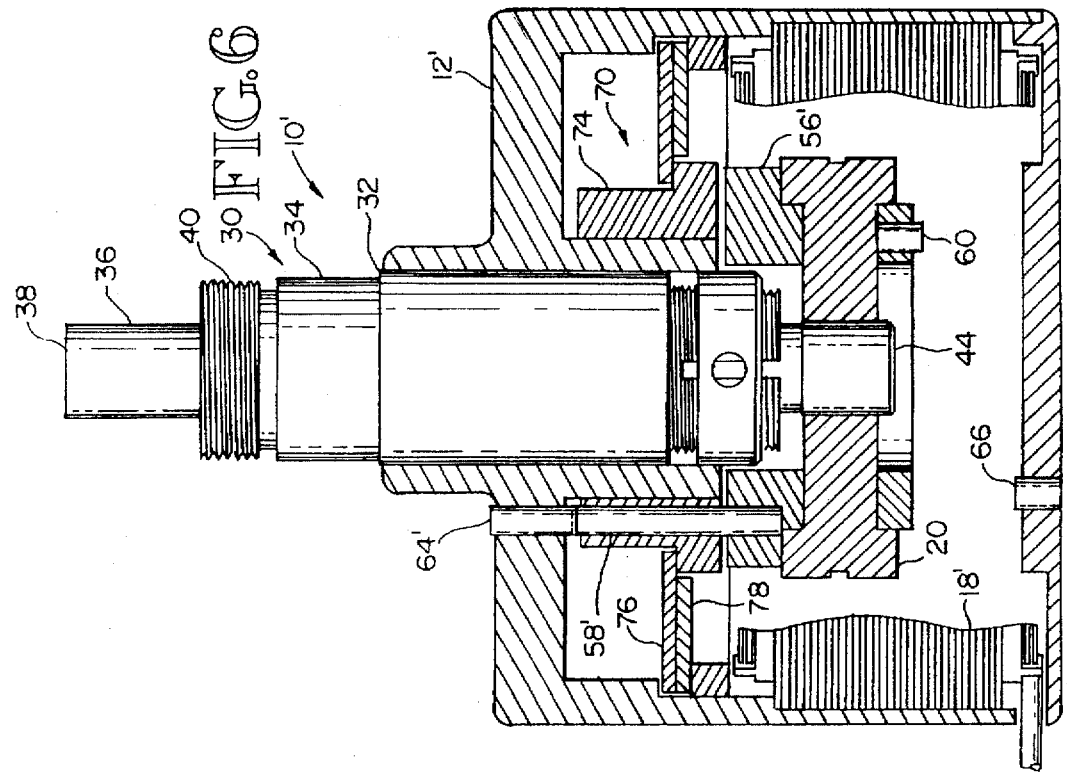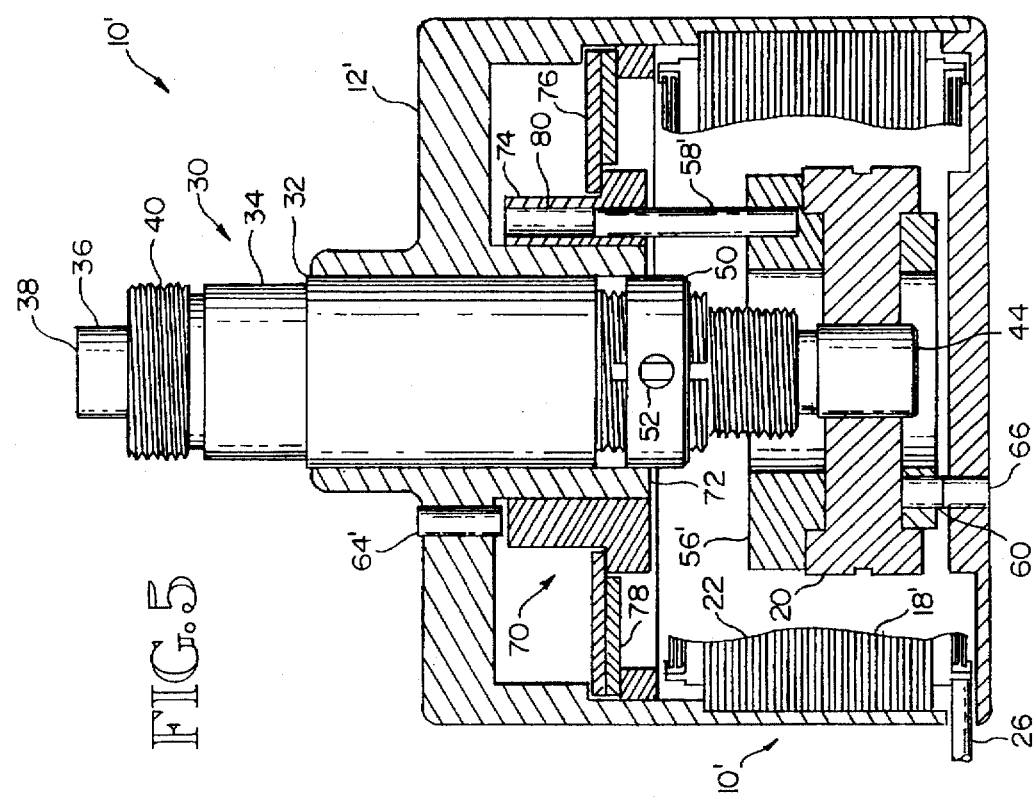

LINER MOTION MICROPOSITIONING APPARATUS AND METHOD

TECHNICAL FIELD

The invention relates to linear motion micropositioning equipment and techniques. More specifically, the invention relates to electric motor type micropositioners.

BACKGROUND OF THE INVENTION

Developments in the semiconductor and biotechnology industries have placed increasing emphasis on the ability to precisely and repeatably position objects at a desired location with respect to a working tool such as a microscope, laser etcher, or micromachining tool. Historically, precision stages employing independent X, Y and/or Z axis motion have been manually driven by micrometer heads, generically known as precision lead screws. Now, however, an increased need for higher resolution, repeatability, and accuracy renders manual adjustment of such positioning equipment difficult or impossible. As a result, electronic micropositioning devices under computer control have assumed these tasks.

There are three principal types of micropositioning devices available today: piezo electric driven devices, direct current servo motor driven devices, and stepper motor driven devices. Each type of device has its own particular advantages and disadvantages with respect to the precise generation of linear motion.

There are three principal characteristics which determine the quality of micropositioning equipment. Those characteristics are resolution, repeatability, and accuracy. As used herein, "resolution" means the size of the smallest linear increment which a micropositioning device can move under electronic control. "Repeatability" means the error within which a given position can be reproduced. "Accuracy" means the absolute deviation between a desired target position and the actual position obtained. Of these three factors, repeatability is typically the most important in that the resolution of a micropositioning device can be selected appropriately for the task at hand, and accuracy limitations can be compensated for as long as the deviations are consistently repeatable.

Piezo electric devices rely on a crystal transducer characterized by the piezo electric effect. That is, when a positive or negative voltage is applied to the crystal, the crystal expands or contracts, generating direct linear motion. A device of this type is advantageously simple, quick, and has high resolution. However, piezo electric devices are limited to a relatively small travel (roughly 0.2% of the length of the active material) and have low repeatability.

Direct current servo motors are rotating machines which can be coupled with precision lead screws through a rotary to linear motion transmission. Micropositioning devices using motors of this type have relatively low rotational inertia compared to alternating current driven machines, can be provided with a long travel or "working distance", and can move relatively large loads. Unfortunately, direct current servo motors do not provide any significant holding torque while the stator windings are de-energized. In addition, devices of this type often have poor resolution and repeatability due to the lack of holding torque, and also because there is always some play or mechanical lash in the rotary to linear motion connection. More significantly, when operated in an open loop mode, the accuracy of a direct current servo motor is extremely low, requiring an absolute or relative position encoder connected to the motor rotor to provide precise position information.

In order to address these limitations of the direct current servo motor driven micropositioning devices, stepper motor type devices have been developed. Stepper motors were developed from brushless direct current motor technology although their operating principals are somewhat different. Hybrid stepper motors employ a cylindrical rotor having a plurality of equally spaced, permanent magnetic teeth around the circumference thereof. The rotor is suspended in a housing having a plurality of circumferencial poles or stators interconnected in two or more phases. The stators comprise electrical windings connected in two or more phases about ferromagnetic cores also having teeth which correspond to the tooth spacing (i.e. "tooth pitch") on the rotor. However, the poles and thus pole teeth are slightly misaligned with the rotor teeth so that by alternately energizing different phases, the rotor can be incrementally stepped so that its teeth align with corresponding teeth on the next adjacent phase. Typically, the different phases of a hybrid stepper motor are staggered by one quarter of the rotor tooth pitch. In such a system, one tooth pitch of the rotor will include four steps. By appropriately modulating the driving signal to the stators, these steps can be further divided into 25 or more "microsteps" providing even further resolution to the system. Theoretically, the angular position of the rotor is known as long as the electrical step impulses to the stator have been counted and kept track of.

As in the direct current servo motor designs, the rotational motion of the rotor is translated through a transmission to a precision lead screw which is fixed to the device housing. The transmission can consist of a tube having one end connected to the rotor, and the other end having a square cavity therein for receipt of a corresponding spindle portion of the precision lead screw. In this manner, the lead screw can move axially with respect to the rotor while remaining rotationally coupled thereto.

A hybrid stepper motor driven linear micropositioning device of the type described above has been made and sold by the assignee of the present invention under the trademark Nanomover™, which represents the state of the art in stepper motor micropositioning devices. That device has a resolution of 10 nanometers, bidirectional repeatability of ±100 nanometers and an absolute accuracy of ±one micron. One disadvantage of the Nanomover™ device, and other stepper or servo motor micropositioning devices, is the relatively large size of the device which results from the necessity of a rotary to linear motion transmission, as well as the inherent lost motion through this mechanical linkage which limits the repeatability and accuracy of such a system. Techniques exists for limiting the effects of such lost motion by either overshooting or undershooting the desired position and then approaching the target position repeatably from the same direction. This technique takes out some of the slack inherent in the rotor to linear transmission, as well as in the threads of the precision lead screw. Nevertheless, a need exists for motor driven micropositioning devices having compact size, and less inherent lost motion.

SUMMARY OF THE INVENTION

It is therefore an object of the present invention to provide a motor driven micropositioning device having compact size and improved lost motion characteristics. The invention achieves these objects, and other objects and advantages which will become apparent from the description which follows by providing a direct connection between a rotating prime mover element of the linear micropositioning device and a precision lead screw component thereof. The device is provided with a plurality of magnetic field generating stators which can drive a rotor under appropriate electronic control. The rotor and stators are relatively axially moveable with respect to one another thus eliminating the need for a rotary to linear motion transmission between the rotor and the precision lead screw.

In a preferred embodiment of the invention, the stators are fixed to a housing and define a longitudinal rotation axis and cylindrical rotor cavity for receiving the rotor. The cylindrical rotor cavity has a longitudinal depth which exceeds the longitudinal depth of the rotor thereby permitting the rotor to move axially with respect to the stators while still under the magnetic field influence thereof. Alternately, the rotor can be provided with an axial depth greater than that of the stators provided that the rotor cavity has sufficient longitudinal depth to permit relative motion there between. Finally, the rotor could be rotationally fixed with respect to a reference frame, and housing having the stators rotated thereabout to provide the desired linear motion. An absolute or relative position encoder can also be provided if a non stepper motor type direct current servo motor is used to drive the precision lead screw.

BRIEF DESCRIPTION OF THE DRAWINGS

FIG. 5 is an enlarged, sectional elevational view of an alternate embodiment of the invention employing a position encoder with the lead screw in a retracted position.

FIG. 6 is an enlarged, sectional elevational view similar to FIG. 5 showing the lead screw in an extended position.

BEST MODE FOR CARRYING OUT THE INVENTION

Figure 1:
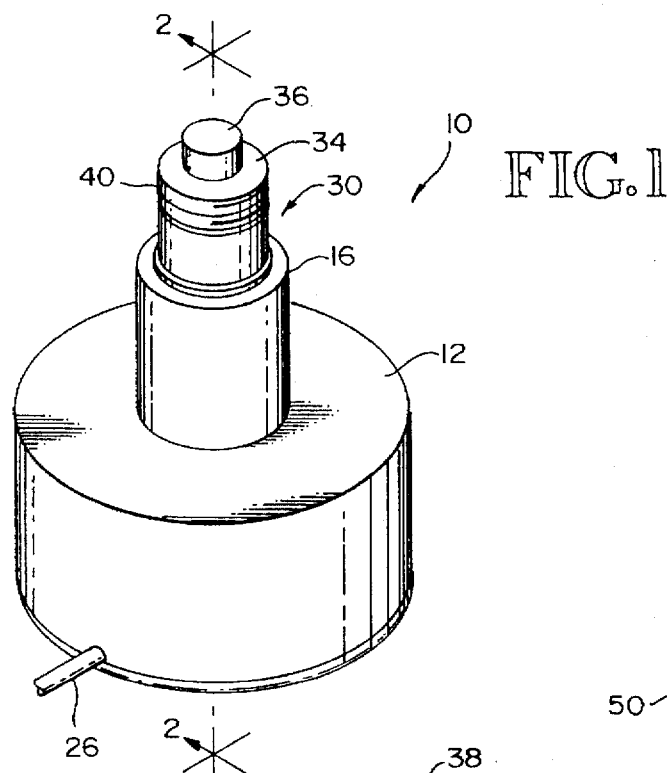
FIG. 1 is an enlarged, isometric view of a linear motion micropositioning device of the present invention.
Figure 4:
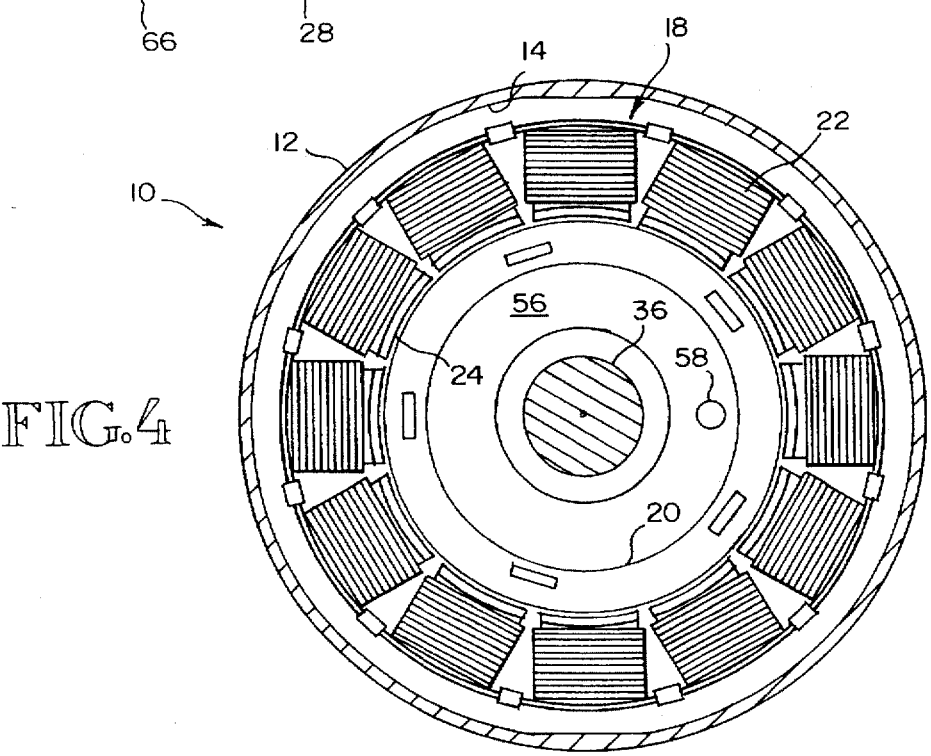
FIG. 4 is a sectional view taken along the line of 4—4 of FIG. 2 showing the rotor and stators of a stepper motor used in conjunction with the present invention.

A linear motion micropositioning device, in accordance with the principals of the invention is generally indicated at reference numeral 10 in FIG. 1. The device has a housing 12 preferably manufactured from heat treated aluminum alloy. The housing has an enlarged diameter portion defining a cylindrical motor cavity 14, and a reduced diameter forwardly extending portion defining a precision lead screw receptacle 16. The housing 12 has a total preferred length of approximately 1.4 inches and a maximum diameter of 1.5 inches. The motor cavity contains a twelve pole, two phase hybrid stepper motor 18 consisting of a rotor 20 preferably of the permanent magnet type and twelve pole windings or stators 22 best seen in FIG. 4. These stators are arranged in a conventional two phase configuration with each triplet of oppositely wound poles angularly displaced 90° with respect to one another. The stator ends 24 have teeth (not shown) positioned in a staggered arrangement with respect to corresponding, equally spaced teeth (not shown) on the rotor 20 in a configuration well known to those of ordinary skill in the art. That is, the different phase of the stators have teeth that are staggered by one quarter of the rotor tooth pitch permitting alternate energization of the phases to move the rotor in one quarter tooth increments or "steps". A cable 26 is provided to energize the stators appropriately and under computer control. A circular back plate 28 closes the motor cavity 14.

Figure 2A:
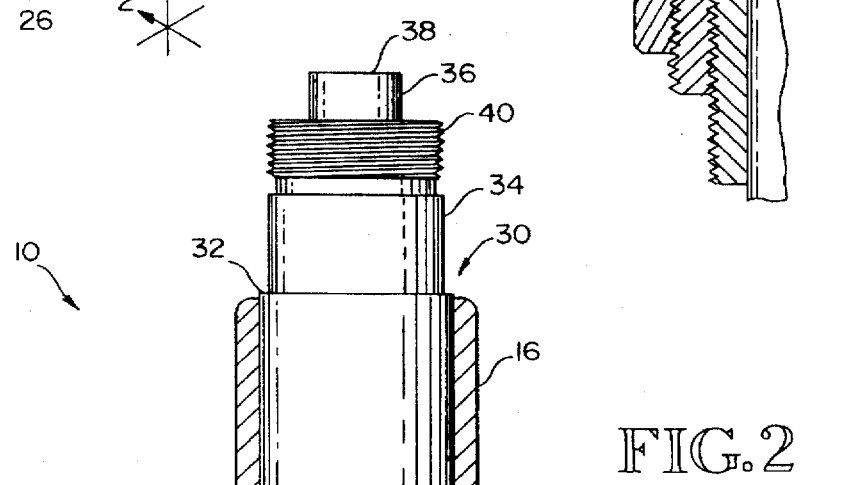
FIG. 2A is an enlarged, partial, sectional view of the circled area in FIG. 2.

The lead screw receptacle 16 receives a precision lead screw generally indicated at reference number 30 in the Figures. The lead screw has a cylindrical outer body 32 which is received in the lead screw receptacle 16. The outer body has an integral cylindrical barrel 34 having internal threads as best seen in FIG. 2A for cooperative engagement with external threads on an axially moveable spindle 36. A free or working end 38 of the spindle extends from the barrel 34 for rotational, and axially reciprocating motion with respect thereto. The free end 38 is used by the end user as a prime mover for precisely positioning microscope stages, micromachine equipment, work surfaces, etc. in a manner well known to those of ordinary skill in the art. The spindle 36 operates over a preferred travel of approximately five millimeters. A free end 40 of the barrel is externally threaded so that the housing 12 may be anchored to a reference fixture.

As stated above, the spindle 36 has external threads which cooperatively mate with the internal threads on the cylindrical barrel 34. Thus, rotation of the spindle with respect to the barrel (or visa versa) causes relative displacement between the spindle free end 36 and barrel free end 40. To this end, the rotor 20 is directly connected to an internal end 44 of the spindle in a press fit made permanent with an appropriate bonding agent such as cyanoacrylate. In order to reduce lash or play between the internal threads of the barrel 34 and external threads of the spindle 36, an internal end of the barrel 46 is provided with longitudinally directed slots 48. A compression ring 50 having internal threads cooperates with the external threads on the barrel 34. The external threads on the barrel 34 are tapered such that twisting the compression ring appropriately, increases or decreases the lash between the barrel and spindle to a desired degree. An aperture 52 is provided for an adjustment wrench (not shown) to adjust the desired position of the compression ring with respect to the barrel. An appropriate precision lead screw is available from Mitutoyo, Japan, Model No. 148–508.

Figure 2:
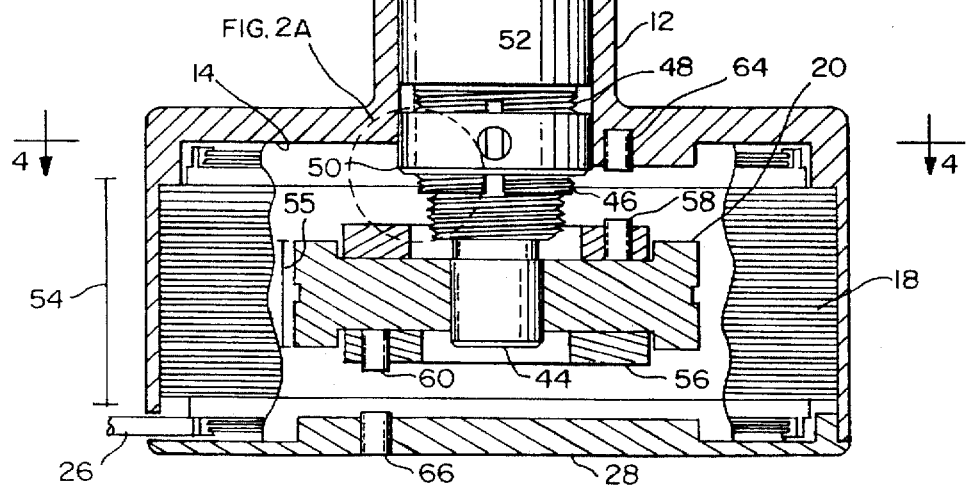
FIG. 2 is an enlarged, sectional elevational view of the device taken along line 2—2 of FIG. 1.
Figure 3:
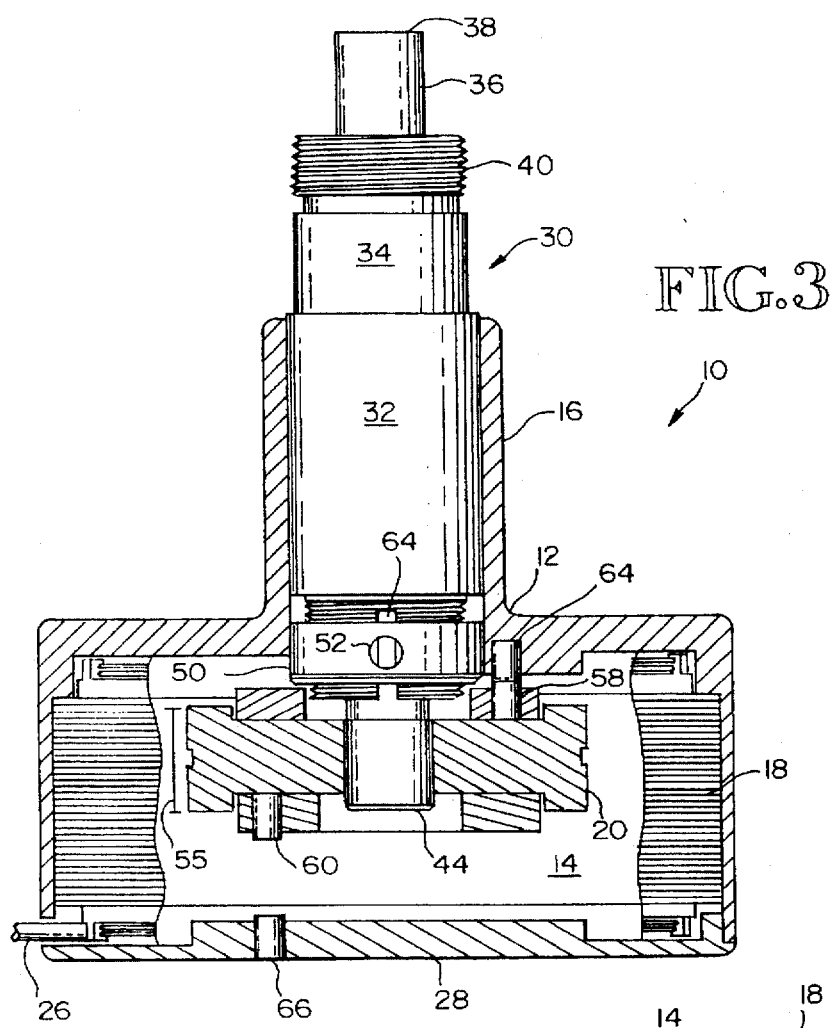
FIG. 3 is an enlarged, sectional elevational view, similar to FIG. 2 in which a precision lead screw portion of the invention is shown fully extended.

As will be apparent upon review of FIGS. 2 and 3, energization of the stators 22 in the appropriate manner causes the rotor 20 to rotate in a clockwise or counterclockwise direction in precise increments or steps causing the spindle free end 38 to extend or retract with respect to the housing 16. In order to maintain magnetic continuity between the stator and rotor, the stator is provided with a longitudinal depth 54 at least equal to the working range or travel of the spindle free end, preferably approximately five millimeters. The rotor 20 has a longitudinal depth 55 which is less than the stator longitudinal depth at least equal to the travel of the spindle so that the rotor may continuously experience the influence of the magnetic fields generated by the stators throughout the rotor's travel. In order to prevent the rotor and spindle from over-traveling, the rotor is provided with an annular adapter 56 permanently affixed thereto. The adapter has forwardly and rearwardly projecting stop pins 58, 60 for respective engagement with appropriately positioned stop pins 64, 66 fixed to the housing 12 and back plate 28. As shown in FIG. 3, the stop pin 58 is positioned radially and circumferencially on the adaptor 56 so as to abut a side of the stop pin 64 once the spindle has reached the end of its travel forward. Similarly, the stop pin 60 will abut against the side of the stop pin 66 at the starting position or minimum travel of the rotor 20 and spindle 36.

The stop pins are provided as mechanical fail safe systems to back up electronic travel limits which may be provided through discreet circuitry, and/or software limits in a manner well known to those of ordinary skill in the art. Tests performed on the embodiment described above show that accuracy in the range of ±200 nanometers, with repeatability of ±100 nanometers are readily obtained.

FIGS. 5 and 6 show an alternate embodiment 10' of the linear motion micropositioning device shown in FIGS. 1-4 in which like elements have been given like reference numerals. The embodiment of FIGS. 1-4 employs a hybrid stepper motor which generally does not require any feedback for confirmation of the absolute position of the rotor and/or spindle. Nevertheless, the general concept of the invention is also applicable to direct current servo motor designs in which a feedback mechanism of the absolute or relative positioning type is desirable, and generally indicated at reference numeral 70 in FIGS. 5 and 6. The positioning system includes an elongated stop pin 58' connected to the adapter 56'. A housing 12' has an annular, inwardly directed portion 72 which forms a bearing for a rotatable, sensor wheel 74 which is journaled for rotation about the portion 72. The wheel carries a rotating sensor ring 76 which interact with fixed sensors 78 connected to the housing 12' to provide absolute or relative position information through an external computer (not shown) by way of the cable 26. The sensors 74, 76 may be of the optical, capacitive or magnetic type according to the desires of those of ordinary skill in this art. The sensor wheel 74 is provided with a longitudinally directed aperture 80 which reciprocally receives the elongated stop pin 58' and journals the sensor wheel 74 for rotation with the rotor 20. The remaining aspects of this embodiment are similar to those in the first embodiment.

Other variations and modifications of the invention will be obvious to those of ordinary skill in this art upon reviewing this disclosure. For example, as referenced herein the housing 12 and stators 22 have been described as fixed with respect to the rotating and axially reciprocating rotor 20 and spindle 36. An arrangement can be conceived wherein the cable 26 is provided with rotary connections to the stators permitting the spindle and rotor to remain longitudinally and rotationally fixed while the stators and housing rotate thereabout thus becoming the prime mover of a modified linear motion micropositioninig device. Therefore, the invention is not to be limited by the above disclosure, but determined in scope by the claims which follow.

I claim:

1. An electronically controllable, linear motion micropositioning device, comprising:

a housing having a plurality of magnetic field generating stators longitudinally and rotationally fixed to housing defining a longitudinal rotation axis and cylindrical rotor cavity having a predetermined longitudinal depth;

a precision lead screw having an outer member fixed to the housing against longitudinal and rotational motion, and an inner member threadably engaged with the outer member for rotational and protruding reciprocal axial motion with respect to the housing; and, a rotor having a plurality of magnetic element for torque inducing magnetic interaction with the stators under electronic control, the element being arranged in a circular pattern defining a longitudinal rotor depth less than the predetermined longitudinal depth of the rotor cavity, the rotor being fixed to the inner member against longitudinal and rotational motion, whereby relative rotation of the rotor with respect to the stators causes controlled relative longitudinal motion over a working distance between the rotor and stators, and between the inner member and the housing with minimal lost motion.

2. The microposition device of claim 1, wherein the housing magnetic field generating stators are ferromagnetic electrical winding and the rotor magnetic field generating elements are permanent magnets.

3. The micropositioning device of claim 2, wherein the windings and magnets have respective field concentrating teeth arranged in a stepper motor pattern.

4. The micropositioninig device of claim 1, wherein the precision lead screw is a micrometer head element.

5. The micropositioninig device of claim 1, wherein the longitudinal rotor cavity depth is greater than the longitudinal rotor depth by an amount at least substantially equal to the working distance.

6. A linear motion positioning device, comprising:

a housing having a plurality of magnetic field generating stators longitudinally and rotationally fixed to the housing and defining a rotation axis;

a lead screw having an outer member fixed to the housing against longitudinal and rotational motion, and an inner member threadably engaged with the outer member for rotational and protruding reciprocal axial motion with respect to the housing; and, a rotor having a plurality of magnetic element for torque inducing magnetic interaction with the stators, the rotor being fixed to the inner member against longitudinal and rotational motion, whereby relative rotation of the rotor with respect to the stators causes relative longitudinal motion over a working distance between the rotor and stators, and between the inner member and member and the housing with minimal lost motion.

7. The positioning device of claim 6, wherein the stators are ferromagnetic electrical windings and the rotor magnetic elements are permanent magnets.

8. The positioning device of claim 7, wherein the windings and magnets have respective field concentrating teeth arranged in a stepper motor pattern.

9. The positioning device of claim 6, wherein the lead screw is a micrometer head element.

10. A method for precisely generating controlled linear motion over a working distance, comprising the steps of:

providing a housing having a plurality of longitudinally and rotationally fixed field generating elements defining a rotor cavity having a predetermined depth;

threadably connecting a longitudinal motion member to the housing;

rigidly connecting a rotor having depth less than the depth of the rotor cavity and also having a plurality of magnetic elements to the longitudinal motion member; and, rotating the rotor with respect to the housing, so that the rotor and magnetic field generating elements move longitudinally with respect to one another and whereby the longitudinal motion member moves longitudinally with respect to the housing over a working distance with minimal lost motion.

* * * * *

UNITED STATES PATENT AND TRADEMARK OFFICE
CERTIFICATE OF CORRECTION

PATENT NO. : 5,744,884  
DATED : April 28, 1998  
INVENTOR(S) : Gregory J. Gerhard It is certified that error appears in the above-identified patent and that said Letters Patent is hereby corrected as shown below:

<u>Title page,</u>  
Please correct the title of the invention as follows:  
"LINEAR MOTION MICROPOSITIONING APPARATUS AND METHOD"

Signed and Sealed this

Nineteenth Day of March, 2002

Attest:

JAMES E. ROGAN  
*Director of the United States Patent and Trademark Office*

*Attesting Officer*